United States Patent

[11] 3,619,795

[72] Inventor Enrique Alfredo José Marcatili
Rumson, N.J.
[21] Appl. No. 27,331
[22] Filed Apr. 10, 1970
[45] Patented Nov. 9, 1971
[73] Assignee Bell Telephone Laboratories, Incorporated
Murray Hill, Berkeley Heights, N.J.

[54] PHASE MATCHING IN DIELECTRIC WAVEGUIDES TO EXTEND THE INTERACTION DISTANCE OF HARMONIC GENERATORS AND PARAMETRIC AMPLIFIERS
4 Claims, 4 Drawing Figs.

[52] U.S. Cl. .................................................. 330/4.6,
307/88.3, 321/69 R, 333/95, 350/96 WG
[51] Int. Cl. .................................................. H03f 7/04
[50] Field of Search .................................................. 307/88.3;
321/69; 330/4.5, 4.6; 350/96 WG

[56] References Cited
UNITED STATES PATENTS
3,537,020 10/1970 Anderson ..................... 330/4.5
Primary Examiner—Roy Lake
Assistant Examiner—Darwin R. Hostetter
Attorneys—R. J. Guenther and Arthur J. Torsiglieri ABSTRACT: The interaction distance in harmonic generators and parametric amplifiers is extended over a sufficiently long distance to effect optimum frequency conversion by forming the nonlinear dielectric medium into a waveguide, and proportioning its cross-sectional dimensions such that the relevant waves propagate with the same phase velocity. In an harmonic generator, the waveguide is proportioned such that the applied fundamental frequency wave and the orthogonally polarized, harmonic wave induced in the medium propagate with the same phase velocity. In a parametric amplifier, the applied signal and the induced idler wave propagate with the same polarization, while the pump wave is orthogonally polarized.

3,619,795

PHASE MATCHING IN DIELECTRIC WAVEGUIDES TO EXTEND THE INTERACTION DISTANCE OF HARMONIC GENERATORS AND PARAMETRIC AMPLIFIERS

This invention relates to nonlinear electromagnetic wave systems.

BACKGROUND OF THE INVENTION

It is known that the effective interaction distance for harmonic generation or other nonlinear effects in a nonlinear dispersive medium is limited to the distance over which the different frequency signals can be approximately phase-matched. At optical frequencies, the prior art practice has been to use birefringent materials and to phase match the ordinary ray of one signal and the extraordinary ray of the other signal, where the two signals are made to propagate in particular directions through the medium. Clearly, such an arrangement is limiting in that it first requires that the nonlinear material be significantly birefringent. In addition, the birefringent axes must be particularly oriented with respect to the direction of polarization of the incident signal. For a further discussion of this class of devices, see U.S. Pat. Nos. 3,387,204; 3,262,058; and 3,234,475.

SUMMARY OF THE INVENTION

The present invention utilizes the fact that the phase velocity of a bounded wave varies as a function of the cross-sectional dimensions of the waveguiding medium. Accordingly, the cross-sectional dimensions of a waveguide are proportioned such that each of the different frequency waves propagating therealong has the same phase velocity. For example, in an optical harmonic generator in accordance with the present invention, a piezoelectric medium is embedded in a low-loss dielectric substrate of slightly lower refractive index, to form an optical transmission line of the type disclosed in my copending application Ser. No. 730,192, filed May 16, 1968, and assigned to applicant's assignee. Alternatively, the entire structure can be made of a piezoelectric material, and the guiding strip formed by means of an ion implantation technique. Whatever fabrication process is employed, however, the cross-sectional dimensions of the nonlinear guiding strip are proportioned such that the phase velocity of a fundamental frequency wave, polarized along one direction, is equal to the phase velocity of an induced, orthogonally polarized, harmonic frequency wave. In this manner the interaction distance can be extended indefinitely, and the nonlinear material need not be birefringent.

In a second embodiment of the invention, a pump wave is applied to the waveguide polarized parallel to one dimension of the guide, along with an orthogonally polarized signal wave. The guide dimensions are then selected such that the phase velocity of the pump wave, the signal wave and the induced idler wave are substantially equal for maximum parametric interaction.

It is an advantage of the invention that the waves are always phase-matched and, hence, devices of optimum length can be readily realized. In addition, by using small waveguides, the beam is confined within a small area over the entire interaction region. As a result, the electric field intensity, for a given power, is uniformly large, thereby reducing the overall length of the devices.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
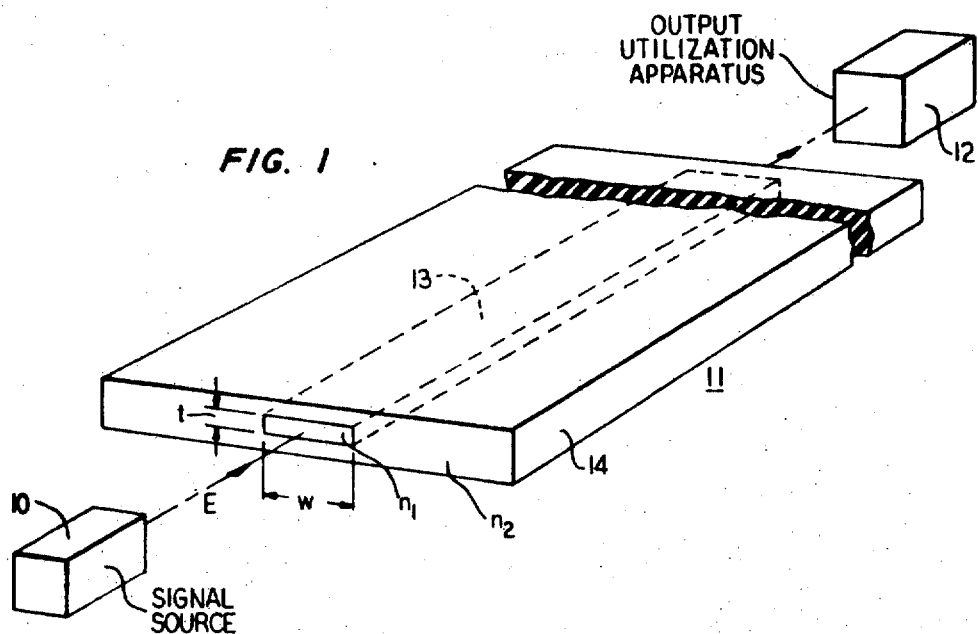
FIG. 1 shows an harmonic generator in accordance with the present invention.

Referring to the drawings, FIG. 1 shows an optical harmonic generator in accordance with the present invention comprising a source 10 of fundamental frequency $\omega$ signal energy; a waveguide 11 for guiding said wave energy; and output utilization apparatus 12 for receiving the transmitted wave energy.

Waveguide 11 is basically the same structure described in my above-identified copending application comprising a transparent (low-loss) dielectric guiding strip 13, of refractive index $n$ embedded in a second, transparent dielectric substrate 14 of slightly lower refractive index $n_2$. For purposes of illustration, strip 13 is totally embedded in substrate 14. This, however, is not necessary. The strip can be placed to top of substrate 14 or can be partially embedded therein. Strip 13 is, in addition, a suitable nonlinear material, i.e., a material whose index of refraction varies as a function of the intensity of the signal. As is known, when a signal of frequency $\omega$ is applied to such a material, a nonlinear interaction results in the generation of harmonics of the fundamental frequency. The efficiency with which this occurs depends upon the interaction distance, which is the distance over which the phase velocities of the fundamental frequency signal and the particular harmonic signal of interest are the same. Typically, however, most media are dispersive so that there is a significant disparity in the phase velocities of the applied signal and the higher frequency, induced signal. If, however, the two signals can be caused to propagate in different modes of propagation, the parameters of the wavepath and, in particular, the dimensions of the wavepath can be selected so that the different frequency signals propagate with the same phase velocity.

Harmonic generation and, more generally, parametric interaction among electromagnetic waves at different frequencies, is possible because all dielectrics are nonlinear at high enough fields. The relationship among the various interacting waves is given by the nonlinear susceptibility tensors. (See "Optical Masers" by G. Birnbaum, Chapter XIII, Academic Press; and "Quantum Electronics," by Ammon Yariv, Chapter 20, John Wiley and Sons, Inc.)

For piezoelectric crystals, i.e., crystals having no center of symmetry, such as KDP, lithium niobate and GaAs, a polarization, $P_i^{2\omega}$, is induced along an $i$ direction at frequency $2\omega$, by incident electromagnetic waves at frequency $\omega$ conventional crystalline axes. More generally, they can be any arbitrary, mutually orthogonal axes. The magnitude of the induced polarization is given by $$P_i^{2\omega} = \chi_{ijk}^{2\omega} E_j^\omega E_k^\omega \qquad (1)$$

where $E_j^\omega$ and $E_k^\omega$ are the magnitudes of the electric fields at frequency $\omega$ along the $j$ and $k$ directions; and $\chi_{ijk}^{2\omega}$ is the component of the susceptibility tensor for the material with respect to the particular set of axes.

Figure 2:
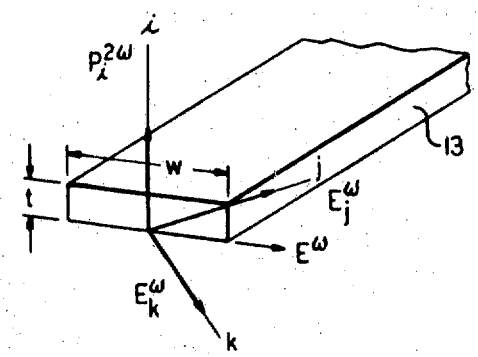
FIG. 2, included for purposes of explanation, shows the applied signal polarized relative to three arbitrary crystallographic axes.

FIG. 2, included for purposes of explanation, shows guiding strip 13 and the three, mutually perpendicular axes, $i$, $j$ and $k$. More specifically, the $i$ axis is shown aligned along a direction parallel to the narrow dimension $t$ of strip 13, while the $j$ and $k$ axes lie in the plane of the broad surface of the strip.

An incident optical wave, having an electric field $E^\omega$, polarized along the direction parallel to the wide dimension $w$ of strip 13 can be resolved into two components, $E_j^\omega$ and $E_k^\omega$, along the $j$ and $k$ directions. If the tensor component $\chi_{ijk}^{2\omega}$ is not equal to zero for the particular material, a polarization $P_i^{2\omega}$ is induced along the $i$ direction.

In the special case where either the $j$ axis or the $k$ axis is oriented parallel to the wide dimension of the strip, the relationships between the applied field and the induced polarization are given by and
$$P_i^{2\omega} = \chi_{ijj}^{2\omega}(E_j^\omega)^2 \quad (2)$$
$$P_i^{2\omega} = \chi_{ikk}^{2\omega}(E_k^\omega)^2, \quad (3)$$

where $\chi_{ijj}^2$ and $\chi_{ikk}^2$ are the tensor components for the particular axes orientations.

Obviously, the crystalline axes are oriented relative to the applied field so as to induce the largest second harmonic polarization. This preferred orientation can be determined from either published data, which give the tensor components, or it can be determined experimentally.

Figure 3:
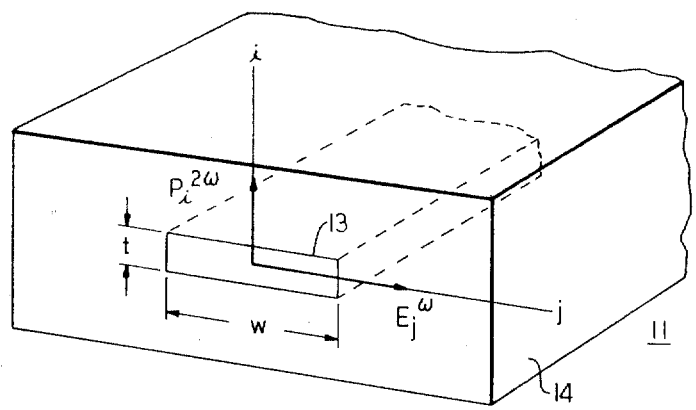
FIG. 3 shows an harmonic generator wherein the signal wave is applied along one of the crystallographic axes.

Accordingly, in accordance with the present invention, strip 13 is a piezoelectric crystalline material whose crystallographic axes are oriented with respect to the geometry of waveguide 11 so as to produce coupling between the applied field and an orthogonally induced second harmonic wave. Advantageously, this orientation is selected to produce maximum coupling between the two waves. This is illustrated in FIG. 3, which shows waveguide 11 wherein the $i$ axis is selected parallel to the narrow dimension $t$ of strip 13, and the incident wave is polarized in the $j-k$ plane, which is parallel to the wide dimension $w$.

To maximize the interaction between the fundamental frequency wave and harmonic frequency wave, the cross-sectional dimensions $w$ and $t$ are proportioned such that the phase velocities of the two waves are equal. This done in accordance with the teachings given in my paper "Dielectric Rectangular Waveguide and Directional Coupler for Integrated Optics," published in the Sept. 1969 issue of the Bell System Technical Journal. For the particular configuration shown in FIGS. 1 and 3, wherein the guiding strip 13 is completely surrounded by the same material, the phase velocities of the fundamental frequency wave, and the orthogonally polarized, harmonic frequency wave are equal when
$$n_{1th}^2 - n_{1ws}^2 = \frac{3}{4}\left(\frac{\lambda}{w}\right)^2\left[1 - \frac{4}{3\pi}\left(\frac{A_{th}}{w} - \frac{n_{2ws}^2 A_{ws}}{4wn_{1ws}^2}\right)\right]$$
$$- \frac{3}{4}\left(\frac{\lambda}{w}\right)^2\left[1 - \frac{4}{3\pi}\left(\frac{A_{wh}n_{2wh}^2}{tn_{1wh}^2} - \frac{A_{ts}}{4t}\right)\right] \quad (4)$$

where $\lambda$ is the free space wavelength of the harmonic frequency;

$t$ and $w$ are the cross-sectional dimensions of the guiding strip;

$$A_{ts} = \frac{\lambda}{2\sqrt{n_{1ts}^2 - n_{2ts}^2}}$$

$$A_{th} = \frac{\lambda}{2\sqrt{n_{1th}^2 - n_{2th}^2}}$$

$$A_{ws} = \frac{\lambda}{2\sqrt{n_{1ws}^2 - n_{2ws}^2}}$$

$$A_{wh} = \frac{\lambda}{2\sqrt{n_{1wh}^2 - n_{2wh}^2}}$$

$n_{1ws}$ and $n_{2ws}$ are the refractive index components, respectively, of the guiding strip, identified by subscript 1, and the substrate, identified by subscript 2, in the $w$ direction, at the frequency of the incident signal;

$n_{1ts}$ and $n_{2ts}$ are the refractive index components, respectively, of the guiding strip and the substrate in the $t$ direction, at the frequency of the incident signal;

$n_{1wh}$ and $n_{2wh}$ are the refractive index components, respectively, of the guiding strip and the substrate in the $w$ direction, at the frequency of the induced harmonic;

and $n_{1th}$ and $n_{2th}$ are the refractive index components, respectively, of the guiding strip and the substrate, in the $t$ direction, at the frequency of the induced harmonic.

For well-guided modes, most of the wave energy is confined within the guiding strip. This implies that the right hand term within each of the brackets of equation (4) is small compared to one, i.e., of the order of 0.25 and less. As a first approximation, therefore, the bracketed terms are approximately equal to unity, and equation (4) simplifies to $$n_{1th}^2 - n_{1ws}^2 = \frac{3\lambda^2}{4}\left[\frac{1}{w^2} - \frac{1}{t^2}\right] \quad (5)$$

Thus, for any given material, one of the guide dimensions can be specified, and the other dimension computed.

For other waveguiding configurations, the more general expressions for the phase velocities of the two waves, given by equations (14) and (24) of my paper, can be used to calculate the guide dimensions.

The optimum length of the interaction region, to produce maximum second harmonic signal, can be determined experimentally. In the visible region of the spectrum this is easily done by visually noting the intensity of the second harmonic signal along the direction of wave propagation. This intensity will vary along this length, reaching a maximum at regularly spaced intervals. The optimum length is defined by one of the maxima.

A similar arrangement can be employed to produce parametric interaction. The relationship among the signal wave, $\omega_s$, the idler wave, $\omega_i$, and the pump wave $\omega_p$, where $\omega_p = \omega_i + \omega_s$, is given, most generally, by $$P_i^{\omega_p} = \chi_{ijk}^{\omega_p} E_j^{\omega_s} E_k^{\omega_i} \quad (6)$$

In the case where $j = k$, we obtain $$P_i^{\omega_p} = \chi_{ijj}^{\omega_p} E_j^{\omega_s} E_j^{\omega_i} \quad (7)$$

$E^{\omega_p} \qquad E^{\omega_s} \qquad E^{\omega_i}$

Figure 4:
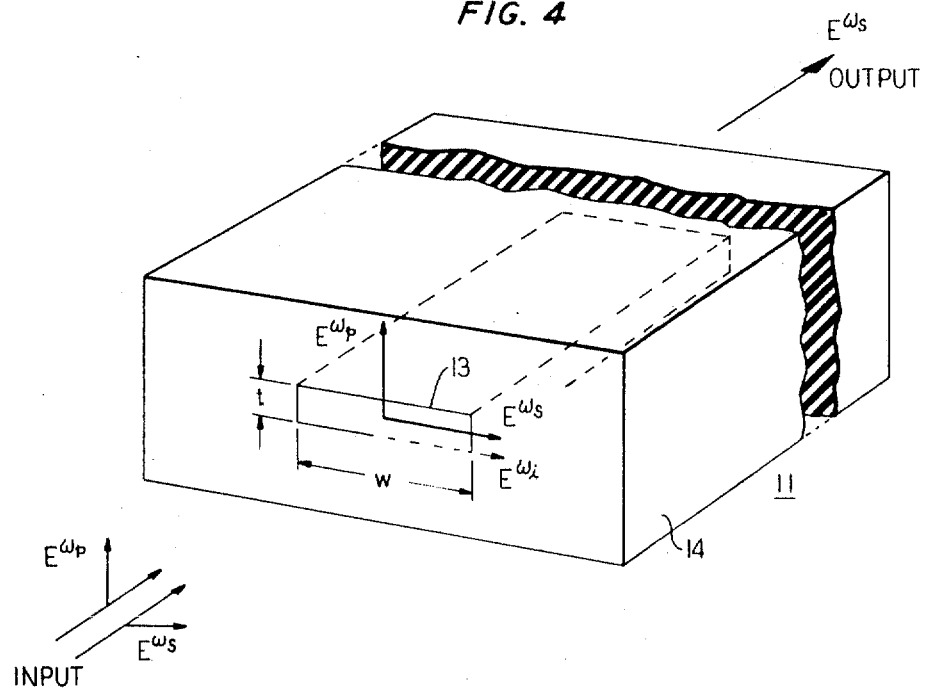
FIG. 4 shows a parametric amplifier in accordance with the present invention.

Thus, in accordance with this second embodiment of the invention, illustrated in FIG. 4, the pump wave E is applied to waveguide 11 polarized parallel to the $t$ dimension of guiding strip 13, and the signal wave E is applied polarized parallel to the $w$ dimension. An idler wave E is induced at the difference frequency, $\omega_i$, polarized parallel to the signal field. By selecting the pump frequency such that it is about twice the signal frequency, $\omega_s$ and $\omega_i$ are almost equal and propagate at about the same phase velocity in guide 11. The guide dimensions $t$ and $w$ are then selected, as explained hereinabove, such that the pump wave has the same phase velocity as the signal and idler waves, thus satisfying the momentum condition for maximum parametric interaction.

While second harmonic wave generation was referred to in connection with FIGS. 2 and 3, it will be recognized that by the proper selection of materials, higher order harmonic waves can be readily generated. In addition, it will be understood that while the various circuits described herein are intended for use at optical frequencies, and have been described with particular reference to the dielectric waveguide described in my above-identified copending application, it will be readily recognized that the invention can be implemented at other frequencies using other types of waveguiding structures. For example, at microwave frequencies, the nonlinear material can be located within a rectangular conductively bounded waveguide, and the cross-sectional dimensions of the latter proportioned such that the orthogonally polarized waves have the same phase velocity. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

I claim:

1. A nonlinear system supportive of orthogonally polarized electromagnetic wave signals having different, related frequencies, comprising:

a rectangular wavepath including a piezoelectric material;
characterized in that the cross-sectional dimensions of said wavepath are proportioned such that the phase velocities of said orthogonally polarized waves are equal.

2. The system according to claim 1 wherein said wavepath comprises:
an elongated strip of said piezoelectric material embedded in a dielectric substrate of lower refractive index.

3. The system according to claim 1 wherein an input signal, polarized along a first direction, induces an orthogonally polarized harmonic signal in said piezoelectric material;
and wherein said signals propagate along said wavepath with the same phase velocity.

4. The system according to claim 1 wherein an input signal, polarized along a first directions, and an orthogonally polarized applied pump signal, induce a difference frequency idler signal in said piezoelectric material polarized along said first direction;
and wherein said signals propagate along said wavepath with substantially the same phase velocity.

* * * * *